Nov. 23, 1954     W. G. TOLAND, JR     2,695,312
PREPARATION OF AROMATIC CARBOXYLIC ACIDS
Filed May 18, 1953
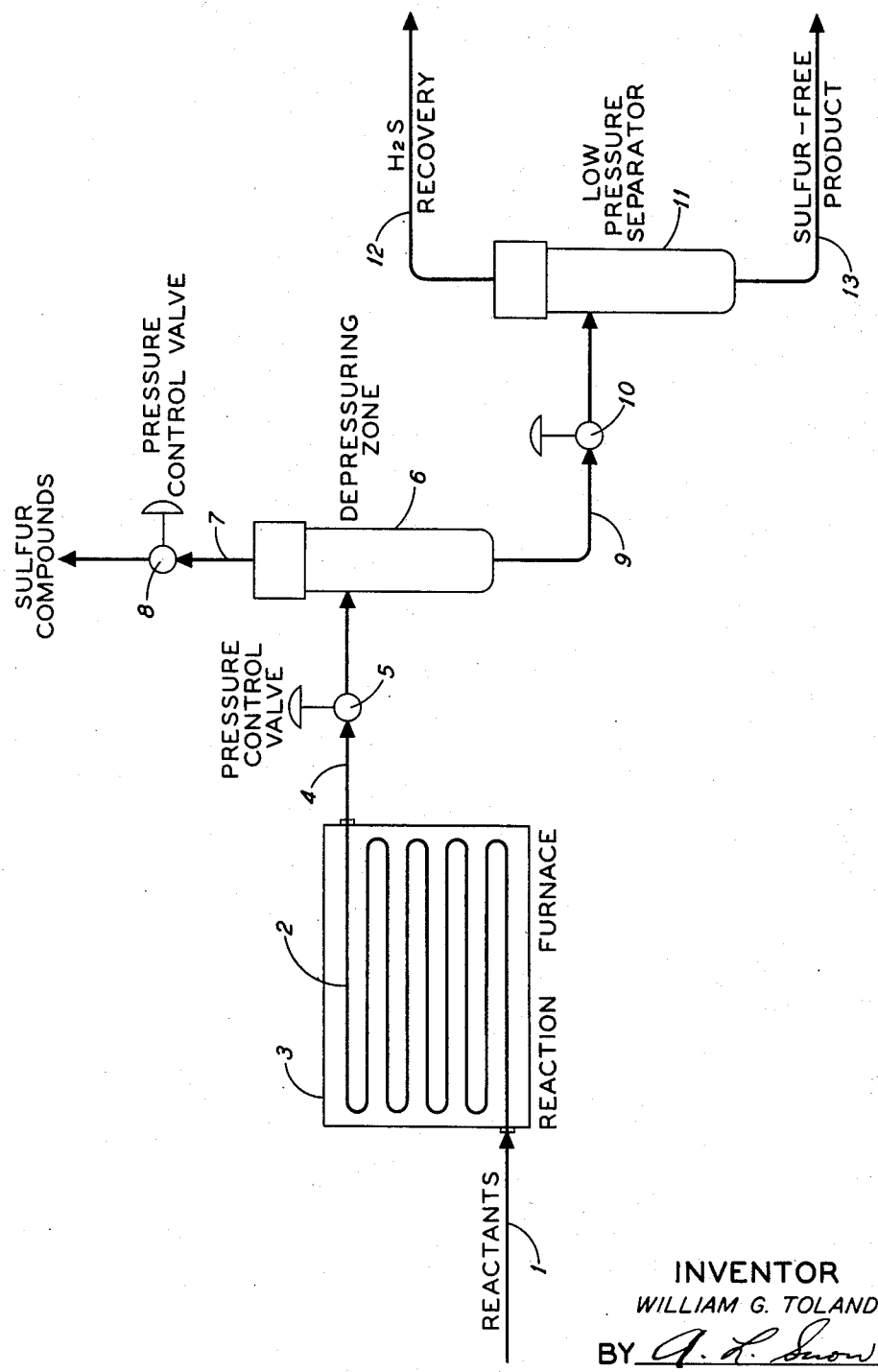
INVENTOR
WILLIAM G. TOLAND JR.
BY
ATTORNEYS

United States Patent Office 2,695,312
Patented Nov. 23, 1954

2,695,312

PREPARATION OF AROMATIC CARBOXYLIC ACIDS

William G. Toland, Jr., San Rafael, Calif., assignor to California Research Corporation, San Francisco, Calif., a corporation of Delaware Application May 18, 1953, Serial No. 355,590

3 Claims. (Cl. 260—524)

This invention relates to an improved process for oxidizing organic compounds to produce organic acidic products. More particularly, the invention relates to an improvement in an oxidation process in which an organic compound, sulfur, water, and a base are heated to a temperature above about 400° F. under a superatmospheric pressure sufficient to maintain a part of the water in liquid phase for a time sufficient to effect conversion of a substantial part of the organic compound to organic acids or organic acid derivatives.

In U. S. Patent No. 2,495,567, a process is described in which acyclic olefins are oxidized to carboxylic acid amides by heating them with sulfur, water and ammonia to a temperature above about 100° C.

More recently, it has been found that alkyl aromatic hydrocarbons such as the xylenes may be oxidized to aromatic carboxylic acids by heating them with sulfur, water, and a base or with ammonium polysulfide to a temperature above about 500° F. under a superatmospheric pressure sufficient to maintain a part of the water in liquid phase and that toluic acids may be similarly oxidized to phthalic acids.

More recently, it has also been found that paraffinic hydrocarbons may be oxidized to aliphatic carboxylic acid derivatives by heating them with sulfur, water, and a base to a temperature above about 400° F. and under a superatmospheric pressure sufficient to maintain a part of the water in liquid phase.

The recovery and purification of the acidic products produced by oxidizing an organic compound with sulfur, water, and a base, as practiced heretofore, has been cumbersome and expensive by reason of a difficulty encountered in attempting to produce an acidic product free of elemental sulfur. The nature of the difficulty may be illustrated by a description of the routine which is followed in separating a purified acidic product from the reaction mixture produced when para-xylene is oxidized by heating it with sulfur, water and ammonia in the manner above described. After the reaction mixture has been held at a temperature of about 600° F. for a period usually in the range 1 to 3 hours, sufficient to convert substantially all of the xylene to phthalic acid, ammonium phthalate and phthalate acid amides, the reactor is depressured and cooled and a reaction product is worked up by first refluxing it at atmospheric pressure to remove ammonia and hydrogen sulfide from the reaction mixture. Following the refluxing, the reaction product mixture is filtered to separate elemental sulfur which may be present. Sodium hydroxide is then added to the filtrate and the mixture is steam stripped to convert the phthalic acid amides present to phthalic acid salts by removing the ammonia. After heating, the mixture is acidified to pH 6 to precipitate any additional elemental sulfur and filtered to remove this sulfur. This second filtrate is then acidified to a pH of 3 to 4 to precipitate solid terephthalic acid. No matter how carefully the steps prior to the final acidification are conducted, it is found that on the final acidification substantial amounts of elemental sulfur are precipitated together with the acid. In order to get rid of this sulfur impurity, it has been necessary to dissolve the terephthalic acid in the calculated amount of aqueous sodium hydroxide, filter from this sulfur, and re-acidify to precipitate sulfur-free terephthalic acid.

It is an object of this invention to provide a simple method for recovering the acid product of the oxidation process free from elemental sulfur.

It appears that the sulfur precipitated together with the acid product in the final acidification step is produced by decomposition of thiosulfate ions, thionate ions and polysulfide ions produced during the course of the oxidation reaction.

It has now been found that the difficulty in eliminating elemental sulfur impurities from the reaction product mixture and from the final acid product can be very substantially reduced by gradually reducing the pressure of the reaction product mixture, while maintaining its temperature at approximately reaction temperature, from the pressure of the reaction zone during the reaction to approximately the pressure of water vapor in equilibrium with liquid water at reaction temperature. During the depressuring step, the materials escaping from the reaction product mixture are predominantly hydrogen sulfide, hydrogen disulfide, ammonia, and water vapor. During the depressuring operation it appears that thiosulfate ions, thionate ions, and polysulfide ions contained in the reaction product mixture decompose and disproportionate to form primarily hydrogen sulfide and sulfate ions. Not only are the thiosulfate ions, thionate ions, and polysulfide ions decomposed and thus eliminated during the depressuring step, but also it appears that a very substantial proportion of the elemental sulfur contained in the reaction product mixture is removed from the reaction product mixture during the depressuring operation, presumably in the form of hydrogen disulfide and in the form of hydrogen sulfide produced by reaction of sulfur with water to form hydrogen sulfide and sulfate ions.

The following examples illustrate the process of the invention.

EXAMPLE 1

160 g. of para-xylene, 292 g. of sulfur, 270 cc. of 28% aqueous ammonium hydroxide and 1500 cc. of water were charged to a 4.5 liter bomb. The bomb was sealed and heated to 600° F. for one hour, with shaking. The final pressure attained in the bomb was 2800 p. s. i. g. Starting with the bomb and contents at 600° F., the normally gaseous components of the reaction product and some of the water vapor were bled from the bomb until the temperature was reduced to 450° F. and the pressure to 200 p. s. i. g. The gases effluent from the bomb during the hot bleeding, were passed through a condenser and 750 cc. of liquid condensate were recovered. The last portion of the condensate recovered had a light yellow color and contained ammonia and hydrogen sulfide as indicated by its odor. This overhead condensate was acidified to pH 2 with 50% sulfuric acid. A light yellow precipitate was formed and hydrogen sulfide was evolved during the addition of the acid. Sodium hydroxide was then added to the condensate to raise the pH to 7. The neutral condensate was filtered and a filter cake consisting essentially of elemental sulfur and having a weight of 5.5 g. was recovered. The remainder of the reaction product was removed from the bomb at 400° F. This material was a thick white paste. Sulfuric acid was added to this paste and it was then filtered, yielding a colorless filtrate and a white filter cake with a faint yellow cast. The filter cake was dissolved in sodium hydroxide, yielding a faintly yellow solution. The solution was heated until ammonia evolution ceased and then sulfuric acid was added to precipitate phthalic acids. The phthalic acids were recovered by filtration and were substantially completely free of elemental sulfur.

EXAMPLE 2

75 g. of meta-xylene, 135 g. of elemental sulfur, 120 cc. of 28% ammonium hydroxide and 685 cc. of water were added to a 2.5 liter bomb. The bomb was sealed and slowly heated to 600° F. It was held at this temperature for 70 minutes, at the end of which time the pressure in the bomb was 2550 p. s. i. g. The normally gaseous reaction products and some water vapor were bled from the bomb, the bleeding being started at 600° F. The material bled from the bomb was passed through a condenser and 400 cc. of liquid condensate were recovered. This condensate contained elemental sulfur, as well as ammonia and hydrogen sulfide. The bomb was cooled, opened, and the normally liquid and solid products were removed. This material was digested with sodium hydroxide until ammonia evolution ceased and then brought to pH 6 with hydrochloric acid and filtered. No elemental sulfur was recovered during the filtration. The filtrate was acidified, precipitating isophthalic acid which was recovered by filtration. The isophthalic acid contained no elemental sulfur.

EXAMPLE 3

A bomb was charged as in Example 2 and heated to 600–610° F. for 75 minutes. The pressure exerted in the bomb at the end of this period was 2500 p. s. i. g. The bomb and contents were cooled to 450° F., at which temperature a pressure of 1400 p. s. i. g. was recorded. The normally gaseous components of the reaction product and some water vapor were bled from the bomb beginning at a temperature of 450° F. and continuing until the temperature reached 440° F. and the pressure was reduced to 250 p. s. i. g. The bomb was cooled and opened. The reaction product remaining in the bomb was a thin light orange slurry. This slurry was steam stripped to a pH value of 5 and filtered hot, yielding a light yellow filtrate. The filter cake appeared to consist of a small amount of tar and color bodies and was essentially free of elemental sulfur. Phthalic acid was recovered as in Example 2 which contained definite but very small amounts of elemental sulfur. The sulfur removal appears to be clearly more effective at higher temperatures, i. e., 500° F. or above, and must be conducted above 400° F. if a prohibitively high content of sulfur impurities is to be avoided.

From the foregoing examples it is clear that depressuring the reaction product mixture by bleeding gases from the mixture at approximately reaction temperature has a very marked effect in reducing the total sulfur content of the reaction product mixture. The process of the invention is especially attractive where the acid produced by the oxidation is normally a solid material. In cases of this kind, acidification of the reaction product mixture precipitates the solid acid and, together with it, solid elemental sulfur unless means are taken to remove the sulfur from the reaction product mixture prior to acidification. The only method then open to the producer for removing the sulfur contaminant from the acid product is that of re-dissolving the acid product in an aqueous base and filtering to remove undissolved elemental sulfur.

The manner in which the process of the invention may be applied to a continuous process for producing organic acids by heating an organic compound with sulfur and ammonia may be described by reference to the appended drawing, which illustrates suitable apparatus and process flow for the practice of the invention. The reactants, for example, para-xylene, elemental sulfur and ammonium hydroxide, are introduced through line 1 into tubular reaction zone 2 of the reaction furnace 3. Reaction furnace 3 supplies sufficient heat to the tubular reaction zone 2 to bring the temperature of the reactants to approximately 600° F. The pressure generated in the reactor will be substantially higher than the vapor pressure of water in equilibrium with liquid water at the reaction temperature and the reactor is operated at a constant pressure in this range. In the oxidation of para-xylene with sulfur, water and ammonia at 600° F., employing the usual proportions of the reactants, the pressure generated is ordinarily approximately 2500 pounds per square inch. This value is nearly 1,000 pounds per square inch in excess of the vapor pressure of water at that temperature.

The reaction product mixture comprising ammonium terephthalate and terephthalic acid amides leaves reaction tube 2 through line 4 and passes through pressure control valve 5 into depressuring vessel 6. Pressure control valve 5 is constructed and arranged to permit the passage of a gas liquid mixture from a zone of high pressure to a zone of substantially lower pressure. Depressuring vessel 6 serves as a vapor liquid separator. Separated vapors are removed from depressuring vessel 6 through line 7, which is controlled by pressure control valve 8, set to maintain a pressure in depressuring vessel 6 slightly above the equilibrium pressure of water vapor with liquid water at the temperature existing in vessel 6.

Depressuring vessel 6 is insulated and provided with a heater not shown to maintain the temperature in the depressuring vessel substantially at reaction temperature, or, in any event, above about 400° F. The liquid reaction product separated in depressuring vessel 6 is withdrawn from that vessel through line 9 and passes through pressure control valve 10, which is opened and closed by an automatic liquid level controller attached to depressuring vessel 6, but not shown. The liquid product passes into low pressure separator 11, where the liquid reaction product is cooled and depressured to atmospheric pressure. Vapors are withdrawn from low pressure separator 11 through line 12 and a sulfur-free liquid product is withdrawn through line 13.

Depressuring prior to acidification of the liquid reaction product pursuant to the process of the invention is carried out at a temperature above about 400° F., preferably above 500° F. irrespective of the temperature at which the reaction has been conducted. Usually, the oxidation reaction will be conducted at temperatures in the range 500° F. to 700° F. so that no net heat input in the depressuring vessel is required and a reasonable amount of cooling of the reaction product may actually occur in that vessel provided that its steady state temperature is not below 400° F.

Where the reaction is conducted batch-wise, for example, in a bomb or pressure autoclave, gradual depressuring is necessary in order to avoid loss of the liquid reaction product by foaming. The bleeding of the reaction product gases ordinarily extends over a period from about 15 minutes to about 1 hour in a batch operation. In a continuous oxidation process, a large depressuring vessel eliminates the hazard of liquid loss through foaming and in such a system it is residence time at the reduced pressure and not the time during which the bleeding or depressuring occurs that is important. The liquid reaction product should be permitted a residence of from 10 minutes to 1 hour in the depressuring vessel in order to provide time for complete decomposition of thiosulfate, thionate and polysulfide ions.

The extent of the pressure reduction pursuant to the process of the invention is substantial. The pressure is ordinarily reduced by from 500 to 1500 pounds per square inch. The pressure is not reduced below the partial pressure of water in the reaction mixture at the depressuring temperature for an appreciable period of time, since it is desirable to maintain a substantial amount of liquid water in the reaction product. If the pressure is permitted to fall below the partial pressure of water at the depressuring temperature for an appreciable period of time, substantial amounts of water will be lost from the reaction product mixture and deposition of a solid product may result. The formation of such a solid reaction product either in a depressuring vessel auxiliary to a tubular reactor or in an autoclave or bomb where batch operation is conducted is undesirable, since the problem of handling the product becomes serious. Such solid reaction products may have to be mechanically dislodged from the walls of the reactor or depressuring vessel, or re-dissolved in hot water in order to conveniently handle them.

The sulfur contamination difficulty stemming from the presence of thiosulfate ion, thionate ion, and polysulfide ion in the reaction product mixture is also encountered in variations of the oxidation process in which ammonium polysulfide is employed instead of elemental sulfur. The difficulty is also encountered where the base introduced into the reaction zone is any of the following: ammonia, ammonium salts, nitrogen compounds convertible to ammonia under the conditions of the reaction, alkali metal hydroxides, alkaline earth metal hydroxides and salts of alkali and alkaline earth metal hydroxides with weak acids, especially weak inorganic acids. The variety of sulfurous materials and basic materials which may be employed together with water to constitute the oxidizing agent of the process and the employment of which is accompanied by the formation of thiosulfate ions in the reaction mixture, thus introducing a sulfur removal problem, is indicated in the following Table I where a number of operative combinations of oxidizing materials is listed.

*Table I.—Oxidizing agents*

1. Elemental sulfur, ammonia, water
2. Elemental sulfur, $NH_4OH$, water
3. Elemental sulfur, urea, water
4. Elemental sulfur, NaOH, water
5. Elemental sulfur, $Na_2CO_3$, water
6. Elemental sulfur, $CaCO_3$, water
7. Elemental sulfur, $NH_3H_2S$, water
8. $(NH_4)_2S_x(X=3-9)$, water The sulfur removal difficulty believed to be attributable to the presence of thiosulfate ions, thionate ions and polysulfide ions in the reaction mixture is experienced not only in the oxidation of olefinic, paraffinic, and alkyl aromatic hydrocarbons, but also in the oxidation of products of partial oxidation of hydrocarbons such as in the oxidation of toluic acid to phthalic acid in runs conducted at temperatures of 545° F. to 600° F. with the oxidizing agents in the above table; in the oxidation of acetophenone to benzoic acid at about 580° F. with the oxidizing agents of the above table; in the oxidation of benzyl alcohol at 600° F. to benzoic acid; and in the oxidation of cyclohexanone at 555° F. to produce phenol. The difficulty is also encountered in the oxidation of heterocyclic compounds containing an oxygen or sulfur atom in the ring such as tetrahydrofuran, furan, thiophene and thiophane and in the oxidation of alkyl sulfides such as diamyl sulfide.

This application is a continuation-in-part of my copending application Serial No. 216,081, filed March 16, 1951, now abandoned.

I claim:

1. In a process for producing aromatic acids by heating a monocyclic aromatic hydrocarbon having at least one hydrogen of the aromatic ring replaced by an alkyl radical and all of the remaining valences of the ring satisfied by hydrogen in a reaction zone with a mixture of sulfur and aqueous ammonia to a temperature above about 400° F. and under a pressure sufficient to maintain a part of the water in liquid phase to produce a reaction product comprising aromatic acid amides and then acidifying the reaction product to liberate the aromatic acids, the improvement which comprises reducing the pressure of the reaction product mixture prior to acidifying while maintaining its temperature at approximately the reaction temperature, from the pressure of the reaction zone to approximately the pressure of water vapor in equilibrium with liquid water at reaction temperature.

2. In a process for producing phthalic acids by heating a xylene in a reaction zone with sulfur, water and ammonia to a temperature above about 400° F. and under a pressure sufficient to maintain a part of the water in liquid phase to produce a reaction product comprising phthalic acid amides and then acidifying the reaction product to liberate the organic acids, the improvement which comprises evaporating the normally gaseous components of the reaction product mixture from the reaction product, prior to acidifying, while maintaining its temperature at approximately the reaction temperature.

3. In a process for producing phthalic acid derivatives by heating a xylene in a reaction zone with sulfur, water and ammonia to a temperature above about 400° F. and under a pressure sufficient to maintain a part of the water in liquid phase, the improvement which comprises reducing the pressure of the reaction product mixture while maintaining its temperature above about 500° F. from the pressure of the reaction zone to approximately the partial pressure of water vapor of the reaction mixture at reaction temperature.

No references cited.